(12) United States Patent
Mowris et al.

(10) Patent No.: US 11,460,208 B2
(45) Date of Patent: Oct. 4, 2022

(54) SMART THERMOSTAT FAN CONTROLLER

(71) Applicants: Robert J. Mowris, Olympic Valley, CA (US); John M. Walsh, Bozeman, MT (US)

(72) Inventors: Robert J. Mowris, Olympic Valley, CA (US); John M. Walsh, Bozeman, MT (US)

(*) Notice: Subject to any disclaimer, the term of this patent is extended or adjusted under 35 U.S.C. 154(b) by 0 days.

(21) Appl. No.: 17/526,725

(22) Filed: Nov. 15, 2021

(65) Prior Publication Data

US 2022/0074617 A1 Mar. 10, 2022

Related U.S. Application Data

(63) Continuation-in-part of application No. 16/909,752, filed on Jun. 23, 2020, now Pat. No. 11,175,060, which is a continuation-in-part of application No. 16/897,634, filed on Jun. 10, 2020, now Pat. No. 11,029,057, which is a continuation-in-part of (Continued)

(51) Int. Cl.

| | |
|---|---|
| *F24F 11/00* | (2018.01) |
| *F24F 11/46* | (2018.01) |
| *F24F 11/56* | (2018.01) |
| *F24F 11/88* | (2018.01) |
| *F24F 11/61* | (2018.01) |

(Continued)

(52) U.S. Cl.
CPC .............. *F24F 11/46* (2018.01); *F24F 11/56* (2018.01); *F24F 11/61* (2018.01); *F24F 11/67* (2018.01); *F24F 11/88* (2018.01); *F24F 2110/10* (2018.01)

(58) Field of Classification Search
None
See application file for complete search history.

(56) References Cited

U.S. PATENT DOCUMENTS

| | | |
|---|---|---|
| 2,394,920 A | 2/1946 | Kronmiller |
| 3,415,309 A | 12/1968 | Fieldler |

(Continued)

FOREIGN PATENT DOCUMENTS

| | | |
|---|---|---|
| EP | 1 904 794 B1 | 1/2011 |
| EP | 2 294 487 B1 | 3/2012 |

OTHER PUBLICATIONS

US 8,702,402 B1, 04/2014, Helt (withdrawn)

(Continued)

*Primary Examiner* — Paul B Yanchus, III
(74) *Attorney, Agent, or Firm* — Averill & Green; Kenneth L Green

(57) ABSTRACT

Detecting a thermostat call for heating or cooling based on detecting a heat W or compressor Y signal is activated and energizing a fan signal output and operating a system fan/blower while the W or Y signal is activated and energizing the fan signal and operating the fan for a variable fan-off delay immediately after the W or Y signal is de-activated and de-energizing the fan signal and not operating the fan after the variable fan-off delay when a fan G signal is not activated. Detecting the fan G signal is activated and the W or Y signal is not activated indicating a fan-on duration control selected by a user, and energizing the fan signal and operating the fan while the fan G signal is activated and de-energizing the fan signal and not operating the fan and not providing the variable fan-off delay when the fan G signal is de-activated.

21 Claims, 9 Drawing Sheets

Related U.S. Application Data application No. 16/882,222, filed on May 22, 2020, now Pat. No. 11,029,061, which is a continuation-in-part of application No. 16/869,396, filed on May 7, 2020, now Pat. No. 11,022,335, which is a continuation-in-part of application No. 16/565,464, filed on Sep. 9, 2019, now Pat. No. 11,187,425, which is a continuation-in-part of application No. 16/289,313, filed on Feb. 28, 2019, now Pat. No. 10,712,036, said application No. 16/869,396 is a continuation-in-part of application No. 16/011,120, filed on Jun. 18, 2018, now Pat. No. 10,663,186, said application No. 16/565,464 is a continuation-in-part of application No. 16/005,666, filed on Jun. 11, 2018, now Pat. No. 10,533,768, said application No. 16/289,313 is a continuation-in-part of application No. 15/614,600, filed on Jun. 5, 2017, now Pat. No. 10,281,938, which is a continuation-in-part of application No. 15/358,131, filed on Nov. 22, 2016, now Pat. No. 9,671,125, said application No. 16/011,120 is a continuation-in-part of application No. 15/169,586, filed on May 31, 2016, now Pat. No. 10,001,289.

(51) Int. Cl.
*F24F 11/67* (2018.01)
*F24F 110/10* (2018.01)

(56) References Cited

U.S. PATENT DOCUMENTS

| | | | |
|---|---|---|---|
| 4,136,730 A | 1/1979 | Kinsey |
| 4,136,822 A | 1/1979 | Felter |
| 4,369,916 A | 1/1983 | Abbey |
| 4,404,815 A | 9/1983 | Gilson |
| 4,773,587 A | 9/1988 | Lipman |
| 4,842,044 A | 6/1989 | Flanders |
| 4,897,798 A | 1/1990 | Cler |
| 5,142,880 A | 9/1992 | Bellis |
| 5,239,834 A | 8/1993 | Travers |
| 5,248,083 A | 9/1993 | Adams |
| 5,447,037 A | 9/1995 | Bishop |
| 5,544,809 A | 8/1996 | Keating |
| 5,582,233 A | 12/1996 | Noto |
| 5,996,898 A | 12/1999 | Parker |
| 6,220,039 B1 | 4/2001 | Kensok |
| 6,223,544 B1 | 5/2001 | Seem |
| 6,415,617 B1 | 7/2002 | Seem |
| 6,464,000 B1 | 10/2002 | Kloster |
| 6,684,944 B1 | 2/2004 | Byrnes |
| 6,695,046 B1 | 2/2004 | Byrnes |
| 6,708,135 B2 | 3/2004 | Southworth |
| 7,444,251 B2 | 10/2008 | Nikovski |
| 7,446,494 B2 | 11/2008 | Grabinger |
| 7,469,550 B2 | 12/2008 | Chapman, Jr. |
| 7,492,233 B2 | 2/2009 | Grabinger |
| 7,500,368 B2 | 3/2009 | Mowris |
| 7,622,828 B2 | 11/2009 | Grabinger |
| 7,632,178 B2 | 12/2009 | Meneely |
| 8,066,558 B2 | 11/2011 | Thomle |
| 8,091,375 B2 | 1/2012 | Crawford |
| 8,195,313 B1 | 6/2012 | Fadell |
| 8,195,335 B2 | 6/2012 | Kreft |
| 8,543,244 B2 | 9/2013 | Keeling |
| 8,588,983 B2 | 11/2013 | Grabinger |
| 8,600,561 B1 | 12/2013 | Modi |
| 8,630,742 B1 | 1/2014 | Stefanski |
| 8,651,391 B2 | 2/2014 | Patch |
| 8,749,182 B2 | 6/2014 | Grabinger |
| 8,965,585 B2 | 2/2015 | Lombard |
| 8,972,064 B2 | 3/2015 | Grabinger |
| 9,041,319 B2 | 5/2015 | Grabinger |
| 9,091,453 B2 | 7/2015 | Matsuoka |
| 9,279,594 B2 | 3/2016 | Steinberg |
| 9,410,713 B2 | 8/2016 | Lau |
| 9,435,557 B2 | 9/2016 | Albrecht |
| 9,500,382 B2 | 11/2016 | Grabinger |
| 9,519,295 B2 | 12/2016 | Burton |
| 9,765,986 B2 | 9/2017 | Thomle |
| 9,874,364 B2 | 1/2018 | Bujak, Jr. |
| 9,981,529 B2 | 5/2018 | Waseen |
| 10,047,969 B2 | 8/2018 | Lau |
| 10,060,642 B2 | 8/2018 | Sikora |
| 10,066,849 B2 | 9/2018 | Lau |
| 10,113,762 B2 | 10/2018 | Grabinger |
| 10,119,719 B2 | 11/2018 | Lau |
| 10,174,966 B2 | 1/2019 | Lau |
| 2004/0217182 A1 | 11/2004 | St. Jean |
| 2006/0219382 A1 | 10/2006 | Johnson |
| 2007/0057075 A1 | 3/2007 | Votaw |
| 2007/0262161 A1 | 11/2007 | Davies |
| 2008/0083834 A1 | 4/2008 | Krebs |
| 2009/0001179 A1 | 1/2009 | Dempsey |
| 2009/0032236 A1 | 2/2009 | Geadelmann |
| 2010/0105311 A1 | 4/2010 | Meneely |
| 2011/0160914 A1 | 6/2011 | Kennett |
| 2011/0190910 A1 | 8/2011 | Lombard |
| 2012/0017611 A1* | 1/2012 | Coffel ............... F24F 11/77 62/89 |
| 2015/0309120 A1 | 10/2015 | Bujak, Jr. |
| 2015/0337831 A1* | 11/2015 | Zhou ............... F24F 11/62 700/282 |
| 2016/0116177 A1 | 4/2016 | Sikora |
| 2016/0348935 A1* | 12/2016 | Yan ............... F24F 11/30 |
| 2018/0038611 A1 | 2/2018 | Lau |
| 2018/0087795 A1 | 3/2018 | Okita |
| 2018/0313567 A1 | 11/2018 | Steinberg |
| 2019/0086106 A1 | 3/2019 | Okita |

OTHER PUBLICATIONS

Southern California Edison, Proctor Engineering Group, Ltd., Bevilacqua-Knight, Inc., Energy Performance of Hot Dry Air Conditioning Systems, Date: Jul. 2008. p. 128, California Energy Commission (CEC), Sacramento, CA, USA.

Proctor Engineering Group, Ltd., Hot Dry Climate Air Conditioner Pilot Field Test, Emerging Technologies Application Assessment Report #0603, Date: Mar. 2, 2007, p. 41, Pacific Gas & Electric Company (PG&E), San Francisco, CA, USA.

Proctor Engineering Group, Ltd., Hot Dry Climate Air Conditioner Pilot Field Test Phase II, Emerging Technologies Program Application Assessment Report #0724, Date: Feb. 8, 2008, p. 39, Pacific Gas & Electric Company (PG&E), San Francisco, CA, USA.

Conant A., Proctor, A., Elberling, L., Field Tests of Specially Selected Air Conditioners for Hot Dry Climates, Published in the Proceedings of the 2008 ACEEE Summer Study on Energy Efficiency in Buildings, Asilomar, California, Date: Aug. 2008, p. 14, American Council for an Energy Efficient Economy (ACEEE), Washington, DC, USA.

Proctor Engineering Group Ltd., Concept 3™ Furnace Fan Motor Upgrade, Date: Oct. 1, 2009, p. 14, Published by Proctor Engineering Group Ltd., 65 Mitchell Blvd Ste 201, San Rafael, CA 94903, USA.

Mars Inc., Series 325 MARS solid state timers, MARS No. 32393 and 32378, Date: Sep. 4, 2007, p. 1, Motors & Armatures, Inc. (MARS), 250 Rabro Drive East, Hauppauge, NY 11788, USA.

ICM Controls Inc., ICM 254 Post Purge Timers, Date: Oct. 2, 2007. p. 1, ICM Controls Inc., 6333 Daedalus Drive, Cicero, N.Y. 13039, USA.

Proctor Engineering Group Ltd., California Air Conditioner Upgrade—Enhanced Time Delay Relay—Residential, Work Paper WPPEGPGE0001, Date: May 18, 2008, p. 15, Published by Proctor Engineering Group Ltd., 65 Mitchell Blvd. Suite 201, San Rafael, CA 94903, USA.

Proctor, J. Fan Controller for Extracting Evaporative Cooling from an Air Conditioning System, Date: Feb. 4, 2008, p. 2, Electronic Filing Receipt for U.S. Appl. No. 61/026,058, John Proctor, 415 Mission Ave., San Rafael CA 94901, USA.

(56) References Cited

OTHER PUBLICATIONS

Proctor Engineering Group Ltd., Workpaper Extended Fan Time Delay Relay, Date: Feb. 9, 2007, p. 7, Published by Proctor Engineering Group Ltd., 418 Mission Ave., San Rafael, CA 94901 USA.

Proctor Engineering Group Ltd., CheckMe!® Concept 3—Brush Free DC by McMillan Installation Instructions, Date: Dec. 31, 2008, p. 7, Published by Proctor Engineering Group Ltd., 418 Mission Ave., San Rafael, CA 94901 USA.

Energy Federation Inc., Promo—Concept 3 High Efficiency Motor, Date: Jan. 29, 2009, p. 3, Published by Energy Federation Inc., 40 Washington St, Westborough, MA 01581 USA.

Proctor Engineering Group Ltd., Promo—Concept 3 PEG Calif-Photo, Date: Dec. 31, 2008, p. 1, Published by Proctor Engineering Group Ltd., 418 Mission Ave., San Rafael, CA 94901, USA.

Proctor Engineering Group Ltd., Enhanced Time Delay Relay Installation Procedure, Date: Nov. 28, 2006, p. 2, Published by Proctor Engineering Group Ltd., 418 Mission Ave., San Rafael, CA 94901, USA.

Proctor Engineering Group Ltd., Air Conditioner Enhanced Time Delay Relay (DelayRelayFactSheet 3-LR.pdf), Date: Dec. 31, 2007, p. 2, Published by Proctor Engineering Group Ltd., 418 Mission Ave., San Rafael, CA 94901, USA.

Conant, A., Proctor Engineering Group, Ltd., California Climate Air Conditioner Upgrade—Enhanced Time Delay Measure Codes H796 Cooling Optimizer Program, Work Paper PGE3PHVC150 Enhanced Time Delay Relay Revision # 1, Date: May 5, 2014, p. 36, Published by PG&E Customer Energy Solutions, San Francisco, CA, USA Available online at: http://deeresources.net/workpapers.

California Utilities Statewide Codes and Standards Team, Codes and Standards Enhancement (CASE) Initiative: Residential Refrigerant Charge Testing and Related Issues, 2013 California Building Energy Efficiency Standards, Date: Dec. 2011, p. 61 (pp. 51-61, Published by Pacific Gas and Electric (PG&E) Company, San Francisco, CA, USA.

Proctor, J., Hairrell, A., An Innovative Product's Path to Market. The influence of laboratory and field evaluations on adoption and implementation, Date: Aug. 2013, pp. 7-8, Published by the International Energy Program Evaluation Conference (IEPEC), Chicago, IL, USA.

Southern California Edison, "SCEData.xls," embedded Excel workbookRef2 on p. 28 of PG&E 2014 (Reference 16), Date: Dec. 5, 2007, p. 5, Pacific Gas and Electric (PG&E) Company, San Francisco, CA, USA Available online at: http://deeresources.net/workpapers.

Ecobee Inc., How to control your HVAC system's fan with your ecobee thermostat, Date: Jan. 13, 2020, p. 10, Published by Ecobee Inc., 25 Dockside Dr., Suite 700, Toronto, ON M5A OB5, Canada. https://support.ecobee.com/hc/en-us/articles/360004798951-How-to-control-your-HVAC-system-s-fan-with-your-ecobee-thermostat.

Google Inc. How to Control Your Fan with a Nest Thermostat, Date: Dec. 30, 2019, p. 4, Published by Google, Inc. 1600 Amphitheatre Parkway, Mountain View, CA 94043 USA. https://support.google.com/googlenest/answer/9296419?hl=en.

Venstar Inc., Venstar Commercial Thermostat T2900 Manual, Date: Dec. 21, 2010, p. 113 pages, Venstar Inc., 9250 Owensmouth Ave., Chatsworth, California 91311. USA. https://files.venstar.com/thermostats/slimline/documents/T2900ManualRev5.pdf. The.

Honeywell International Inc., TB8220 Commercial VisionPRO™ Programmable Thermostat, Date: Mar. 15, 2005, p. 24, Honeywell International Inc., 1985 Douglas Drive North, Golden Valley, MN 55422 USA. https://customer.honeywell.com/resources/techlit/TechLitDocuments/63-0000s/63-2625.pdf.

Carrier Corporation Inc., Totaline Gold Installation and Operating Instructions. Date: 2007. p. 16, United Technologies Corporation, One Carrier Place, Farmington, CT 06034-4015 USA https://dms.hvacpartners.com/docs/1005/Public/08/P274-2SI.pdf.

* cited by examiner

SMART THERMOSTAT FAN CONTROLLER

CROSS-REFERENCE TO RELATED APPLICATIONS

The present application is a Continuation In Part of U.S. patent application Ser. No. 16/909,752 filed Jun. 23, 2020, which is a Continuation in Part of U.S. patent application Ser. No. 16/897,634 filed Jun. 10, 2020, which is a Continuation In Part of U.S. patent application Ser. No. 16/882,222 filed May 22, 2020, which is a Continuation In Part of U.S. patent application Ser. No. 16/869,396 filed May 7, 2020, which is a Continuation In Part of U.S. patent application Ser. No. 16/565,464 filed Sep. 9, 2019, which is a Continuation In Part of U.S. patent application Ser. No. 16/289,313 filed Feb. 28, 2019, and U.S. patent application Ser. No. 16/565,464 filed Sep. 9, 2019, also claims the priority of U.S. Provisional Patent Application Ser. No. 62/728,518 filed Sep. 7, 2018, and U.S. patent application Ser. No. 16/565,464 filed Sep. 9, 2019, is also a Continuation in Part of U.S. patent application Ser. No. 16/005,666 filed Jun. 11, 2018, and U.S. patent application Ser. No. 16/869,396 filed May 7, 2020, is also a Continuation In Part of U.S. patent application Ser. No. 16/011,120 filed Jun. 18, 2018, which is a Continuation In Part of U.S. patent application Ser. No. 15/169,586 filed May 31, 2016, and U.S. patent application Ser. No. 16/289,313 filed Feb. 28, 2019, is a Continuation In Part of U.S. patent application Ser. No. 15/614,600 filed Jun. 5, 2017, which is a Continuation In Part of U.S. patent application Ser. No. 15/358,131 filed Nov. 22, 2016.

BACKGROUND OF THE INVENTION

The present invention relates to Heating, Ventilating, and Air Conditioning (HVAC) systems, and a fan controller controlled by a user, an HVAC system control board, a thermostat, or an energy management system.

Known smart thermostats may provide a fan control option to operate the fan for a fraction of an hour which may be set by a user to repeat every hour. For example, a non-patent publication by Ecobee Inc. describes an intermittent fan-on minimum setting operating on an hourly basis. "If the Fan Min On Time is set for 15 minutes or lower, the fan will operate in two separate segments across the hour; if the Fan Min On Time is set for 20 minutes or higher, the fan will run in four equal segments (of 5 minutes or more each) across the hour. If a heating or cooling cycle operates within any given hour, the length of either cycle will be deducted from the Fan Min On Time. For example, if your cooling runs for 5 minutes and your Fan Min On Time is set to 20 minutes, 5 minutes will be deducted from the Fan Min On Time." See non-patent publication by Ecobee Inc., "How to control your HVAC system's fan with your ecobee thermostat" Date: Jan. 13, 2020, Page 7, Published by Ecobee Inc., 25 Dockside Dr., Suite 700, Toronto, ON M5A OB5, Canada https://support.ecobee.com/hc/en-us/articles/360004798951-How-to-control-your-HVAC-system-s-fan-with-your-ecobee-thermostat. Also see non-patent publication by Google Inc. "How to Control Your Fan with a Nest Thermostat," Date: Dec. 30, 2019, Pages 1, Published by Google, Inc., 1600 Amphitheatre Parkway, Mountain View, Calif. 94043 USA. https://support.google.com/googlenest/answer/9296419?hl=en.

Known fan controllers provide fan-off delays at the end of a fan G signal energized by itself without an AC Y signal or without a heat W signal and operate the fan longer than a user selected hourly or intermittent fan-on duration which increases fan energy use by 20 to 50%. Known fan controllers do not provide a solution to resolve the unresolved problem of increasing fan energy use during hourly or intermittent fan-on operation that wastes HVAC energy specifically when a building is unoccupied.

BRIEF SUMMARY OF THE INVENTION

Smart thermostats provide many methods for users to select an hourly fan-on duration control or an intermittent fan-on duration control for a fraction of an hour to operate a system fan/blower of a Heating, Ventilating, Air Conditioning (HVAC) system for a fraction of each hour. Known fan controllers that provide a fan-off delay using the fan G signal as a proxy for an Air Conditioning (AC) compressor Y signal (or "AC Y signal" or "compressor Y signal") will provide a fan-off delay at the end of every fan G signal from the thermostat which will operate the fan longer than the user selected hourly or intermittent fan-on duration. The present invention smart thermostat fan controller monitors and detects when the fan G signal is energized without a thermostat call for cooling or without a thermostat call for heating, and does not provide a fan-off delay after the fan G signal from the thermostat is de-energized (without a thermostat call for cooling or heating) to avoid wasting fan energy.

Known fan controllers can inadvertently provide significantly more fan energy (e.g., 800 to 2400 kWh/yr) depending on the fan motor power (kilowatts or kW), hours of intermittent fan-on operation per year, and the fan-off delays provided by known fan controllers. The extra fan energy provided by known fan controllers that provide a fan-off delay after every fan-on period can be greater than the expected energy savings provided by smart thermostats. For example, if only 6 to 10 percent of smart thermostat users select a 30-minute intermittent fan-on duration per hour and also have a known fan controller that provides a fan-off delay after each intermittent fan-on duration, then the extra fan energy used by only the 6 to 10 percent of users with the known fan controller may increase energy use enough to offset or eliminate energy savings for the remaining 90 to 94% of users who do not select a 30-minute intermittent fan-on duration.

The smart thermostat fan controller resolves this problem and avoids wasting fan energy by monitoring the fan G signal input, the AC Y signal input, and the heat W signal input from the thermostat and not providing a fan signal output from a switching device and not energizing a fan relay and operating a system fan/blower of a HVAC system for a fan-off delay at the end of the fan G signal duration when the fan G signal input was previously energized and the AC signal input was not previously energized or when the fan signal input was previously energized and the heat W signal input was not previously energized. When only the fan G signal from the thermostat is energized without the AC Y signal or the heat W signal being energized, the smart thermostat fan controller provides the fan G signal output from the switching device to energize a fan relay and operate the system fan/blower.

The smart thermostat fan controller also energizes the at least one switching device and the fan signal output to energize a fan relay and operate the system fan/blower for a variable fan-off delay after the AC Y signal input (or heat W signal) input is de-energized. The variable fan-off delay occurs simultaneously with a thermostat fan-off delay or the thermostat fan-off delay is subtracted from the variable fan-off delay or the thermostat fan-off delay is zero. The smart thermostat fan controller may also detect and report a fan-on alarm message for a user to override a fan-on duration control to save energy and improve occupant comfort.

BRIEF DESCRIPTION OF THE DRAWINGS

The above and other aspects, features and advantages of a smart thermostat fan controller will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined based on the claims.

Figure 1:
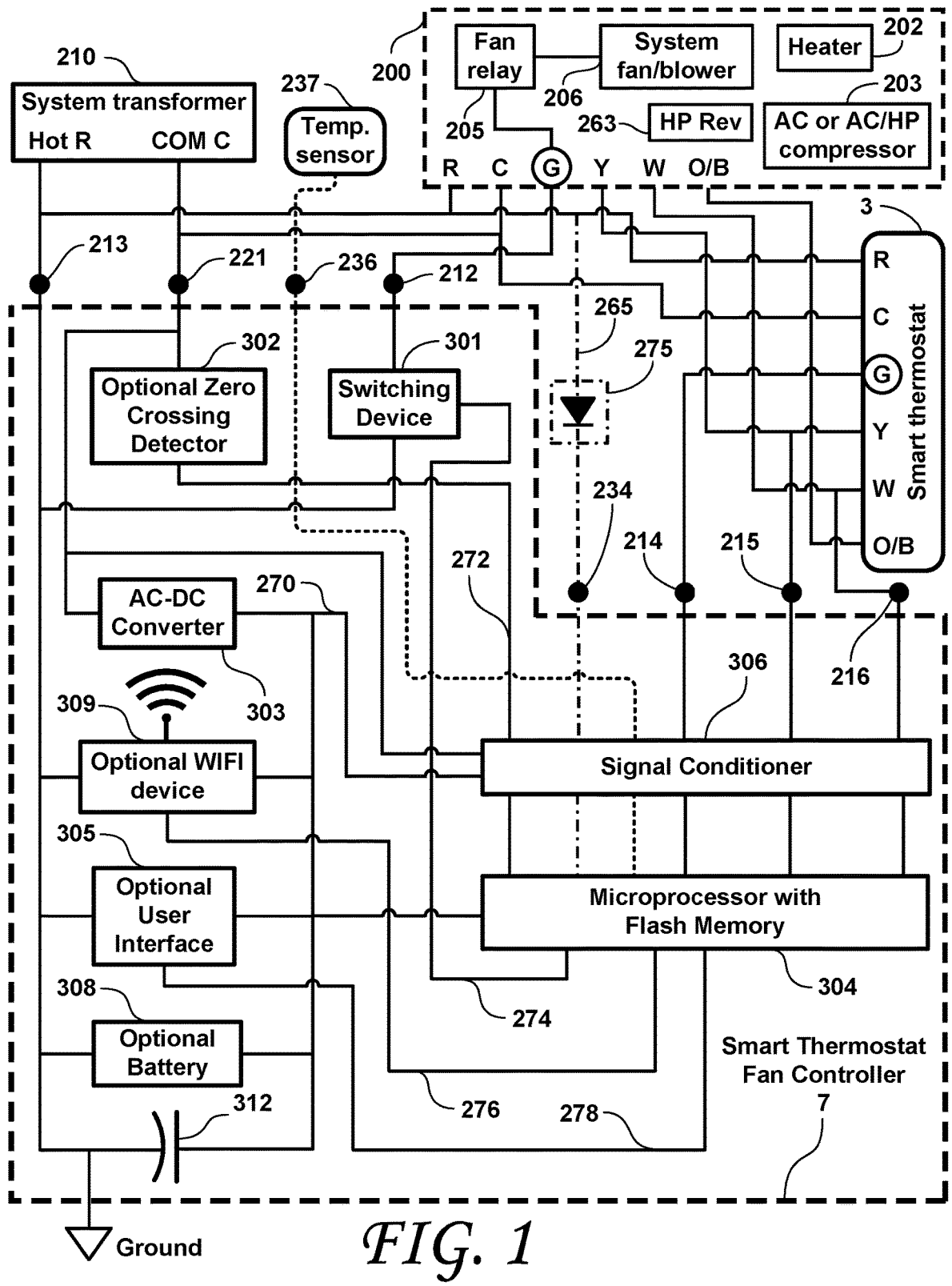
FIG. 1 shows the smart thermostat fan controller apparatus comprising: a plurality of low-voltage signal inputs to control a system fan/blower of a Heating, Ventilating, Air Conditioning (HVAC) system; an AC-DC converter, a signal conditioner, a microprocessor, at least one switching device; and at least one low-voltage signal output comprising a fan signal output.

FIG. 1 shows a smart thermostat fan controller 7 receiving signals from a smart thermostat 3 where the smart thermostat 3 controls a Heating, Ventilating, Air Conditioning (HVAC) system or HVAC system 200 comprising a fan relay 205, a system fan/blower 206, a heater 202, an optional Heat Pump (HP) reversing valve (HP Rev) 263, and an Air Conditioning (AC) or an AC/HP compressor 203. The smart thermostat 3 and the HVAC system 200 receive electrical power from a hot R terminal of a system transformer 210 to a R terminal of the smart thermostat 3 and the R terminal of the HVAC system 200 and a COM C (common) terminal of the system transformer 210 to a C terminal of the smart thermostat 3 and the C terminal of the HVAC system 200. The smart thermostat 3 controls the HVAC system 200 by energizing or de-energizing a fan G signal on a G terminal, a compressor Y signal on a Y terminal, a heat W signal on a W terminal, and a HP Rev signal on an O/B terminal connected to the HVAC system 200 inputs G, Y, W, and O/B. FIG. 1 shows the G terminal of the smart thermostat G is electrically connected to the fan G signal input 214 of the smart thermostat fan controller 3 and the fan signal output of the smart thermostat fan controller 7 is electrically connected to the G terminal of the HVAC system 200 which is electrically connected to a fan relay 205 and the system fan/blower 206 which circulates air from a conditioned space (not shown) through the HVAC system 200.

The smart thermostat fan controller 7 comprises: a plurality of signal inputs to receive low-voltage signals from the smart thermostat 3, an AC-DC converter 303, a signal conditioner 306, a microprocessor 304, at least one switching device 301; and at least one low-voltage signal output comprising the fan signal output 212 which controls the fan relay 205 and the system fan/blower 206. The signal inputs include: a hot R signal input 213, a COM C signal input 221, the fan G signal input 214, an AC Y signal input 215, a heat W signal input 216, an optional HP detect signal input 234, and at least one optional temperature sensor input 236 from at least one temperature sensor 237 to monitor at least one drybulb temperature selected from the group consisting of: a Conditioned Space Temperature (CST), a Return Air Temperature (RAT), and a Supply Air Temperature (RAT). The optional HP detect signal input 234 provides at least one signal selected from the group consisting of: a sinusoid signal provided by a wire 265 connected to a hot R signal from the system transformer 210 to detect a HP reversing valve 263 energized for cooling on the heat W signal input 216, and a rectified signal provided by an optional diode 275 connected to the hot R signal from the system transformer 210 to detect the HP reversing valve 263 energized for heating on the heat W signal input 216. The HP reversing valve 263 is energized or de-energized by an O/B output signal from the smart thermostat 3.

FIG. 1 shows the fan signal output 212 is connected to the at least one switching device 301 which is controlled by the microprocessor 304 (which includes flash memory) which energizes the at least one switching device 301 using a fan control signal 274. The fan signal output 212 is electrically connected to the fan G terminal of the HVAC system 200 which is electrically connected to the fan relay 205 and the system fan/blower 206 to circulate air through the HVAC system. FIG. 1 shows the COM C signal input 221 connected to an optional zero crossing detector 302 which provides a digital timing signal 272 to the signal conditioner 306 which transforms the 24 Volts Alternating Current (VAC) analog signal inputs to low-voltage digital signals. In another embodiment the digital timing signal 272 is provided in a software program in the microprocessor 304.

The microprocessor 304 keeps track of seconds and minutes by either monitoring the output from the optional zero crossing detector 302, or by counting microprocessor clock cycles using a 60 Hz electrical signal to provide precise timing which does not vary from system to system or due to aging or temperature of the components. Each positive zero crossing accounts for 1/60th of a second; therefore, sixty positive crossings occur each second. The seconds are then accumulated to keep track of minutes. The negative crossings are also monitored to provide timing for the at least one switching device 301. The microprocessor 304 continuously monitors all inputs to determine if there is any change to the current system operation. The microprocessor 304 contains flash memory, to store the programming instructions and data when there is no power applied to the unit.

If the optional HP detect signal input 234 is not connected from the system transformer 210 to the smart thermostat fan controller, then the microprocessor 304 detects the optional HP detect signal input 234 is floating and processes the heat W signal input as connected to an HVAC system with a gas furnace, electric resistance, or hydronic heating system. If the optional HP detect signal input 234 is connected with a wire 265 (shown as a dashed line) to the hot R signal input from the system transformer 210, then the microprocessor 304 detects the optional HP detect signal input 234 as a sinusoid waveform (driven above and below ground) and processes the heat W signal input 216 as a HP Rev signal input energized for cooling. If the wire 265 is connected to the positive anode terminal of an optional diode 275 with the negative cathode terminal connected to the HP detect signal input 234 and the wire 265 is also connected to the hot R signal input from the system transformer 210, then the optional HP detect signal input 234 provides a positive signal during the positive cycle of the hot R signal input 213 and a floating signal during the negative cycle (where the signal is rectified by the optional diode 275) which allows the microprocessor 304 to process the heat W signal input 216 as a HP Rev signal input energized for heating.

FIG. 1 also shows the COM C signal input 221 connected to an AC-DC converter 303 which receives a low voltage power signal from the system transformer 210. The hot R signal input 213 is shown as a ground in FIG. 1. In another embodiment, the hot R signal input 213 can be switched with the COM C signal input 221. If these inputs are switched, the COM C signal input 221 would be used as a ground and the hot R signal input 213 would be connected to the optional zero crossing detector 302 and the AC-DC Converter 303, but the hot R signal input 213 would still be connected to the at least one switching device 301, and the COM C signal input 221 would still be connected to the signal conditioner 306. The AC-DC converter 303 provides an optional power supply voltage 270 to the signal conditioner 306 and the microprocessor 304. FIG. 1 also shows an optional WIFI device 309 for wireless communication connected to the microprocessor 304 by a wire carrying a digital signal 276, an optional user interface 305 connected to the microprocessor 304 by a wire carrying a digital signal 278, an optional battery 308, and a capacitor 312.

Figure 2:
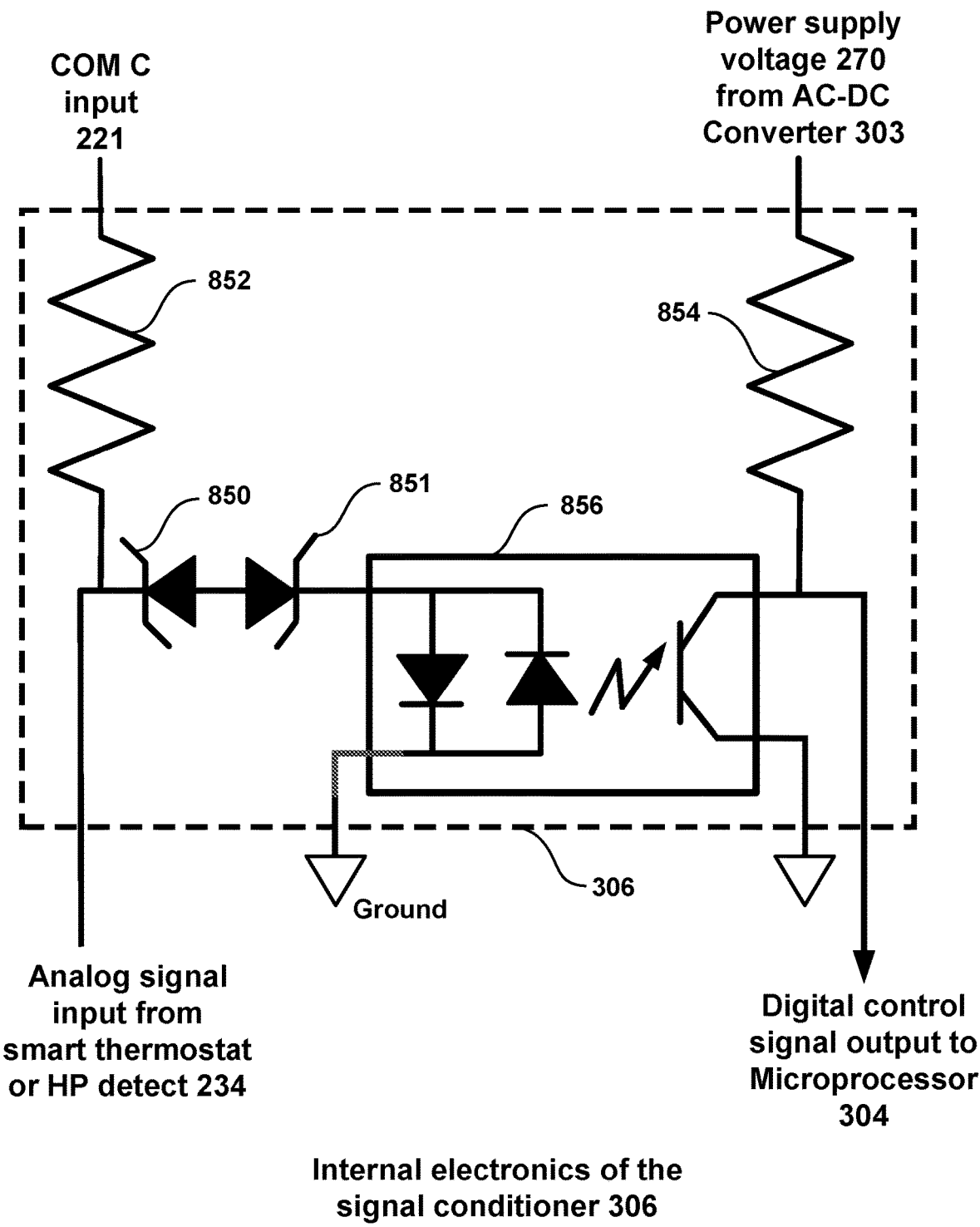
FIG. 2 shows internal electronics of the signal conditioning element.

FIG. 2 shows an embodiment of the internal electronics of the signal conditioner 306 used to process analog signal inputs. FIG. 2 shows the COM C signal input 221 providing a reference voltage to an optional load resistor 852. FIG. 2 also shows the optional power supply voltage 270 from the AC-DC converter 303 providing power for an optional pull-up resistor 854 and an analog signal input to process analog signal inputs from the smart thermostat including the fan G signal input 214 (see FIG. 1), the AC Y signal input 215, the heat W signal input 216 or the optional HP detect signal input 234. FIG. 2 shows a typical digital signal output to the microprocessor 304 which would include all the smart thermostat signals as digital signals. FIG. 2 shows a first Zener diode 850, a second Zener diode 851, and an opto-isolator 856 comprising two Light Emitting Diodes (LEDs) and a photo-sensitive transistor which could be configured with a single LED. The two LEDs are used to signal the microprocessor on both the positive and negative cycles of the analog alternating current signal.

The signal conditioner 306 is used to process false positive "stray" voltage signals from the HVAC system caused by a faulty gas valve solenoid, a faulty contactor, a faulty fan relay, an induced voltage due to a wiring issue or a smart thermostat due to a power stealing current. Known fan controllers interpret false positive stray voltage signals (e.g., 10 VAC waveforms) as a thermostat signal attempting to energize a fan, a heating system, or a cooling system which are typically 24 VAC signal input voltages. The smart thermostat fan controller resolves the unresolved false positive stray voltage signal problem by using the first Zener diode 850 and the second Zener diode 851 in series with the input signal and opposite polarity. The signal passes through an opto-isolator 856 which transfers electrical signals between two isolated circuits by light from the LEDs. The opto-isolator 856 processes the 24 VAC analog signal to a digital signal for the microprocessor 304. The opto-isolator 856 output is pulled up to the optional power supply voltage 270 through the optional pull-up resistor 854 to subtract the rated value of the first Zener diode 850 or the second Zener diode 851 forward bias and the forward bias of the LEDs in the opto-isolator 856 from the analog signal input. If the first Zener diode 850 and the second Zener diode 851 have a value of 15 V, then approximately 16.7 V will be subtracted from the analog signal input before the microprocessor 304 receives the low-voltage digital signal from the opto-isolator 856 and the optional pull-up resistor 854.

The signal conditioner 306 eliminates false positive stray voltage signals from being processed as active signals until the signal surpasses a minimum threshold voltage. In one embodiment the minimum threshold voltage is 16.7 VAC. The method comprises eliminating at least one false positive stray voltage signal by establishing at least one minimum threshold voltage for at least one active control signal from the thermostat using at least one Zener diode and at least one opto-isolator and processing the at least one active control signal from the thermostat selected from the group consisting of: the fan G signal, the compressor Y signal, and the heat W signal. The optional load resistor 852 shown in FIG. 2 is connected between the input pin to the transformer common to provide a current path to the smart thermostat if the signal is disrupted by the fan G signal input 214. The value of the optional load resistor 852 is similar to the fan relay of the HVAC system in order for the smart thermostat fan controller 7 to be transparent and not cause any control or reliability issues for the smart thermostat.

Figure 3:
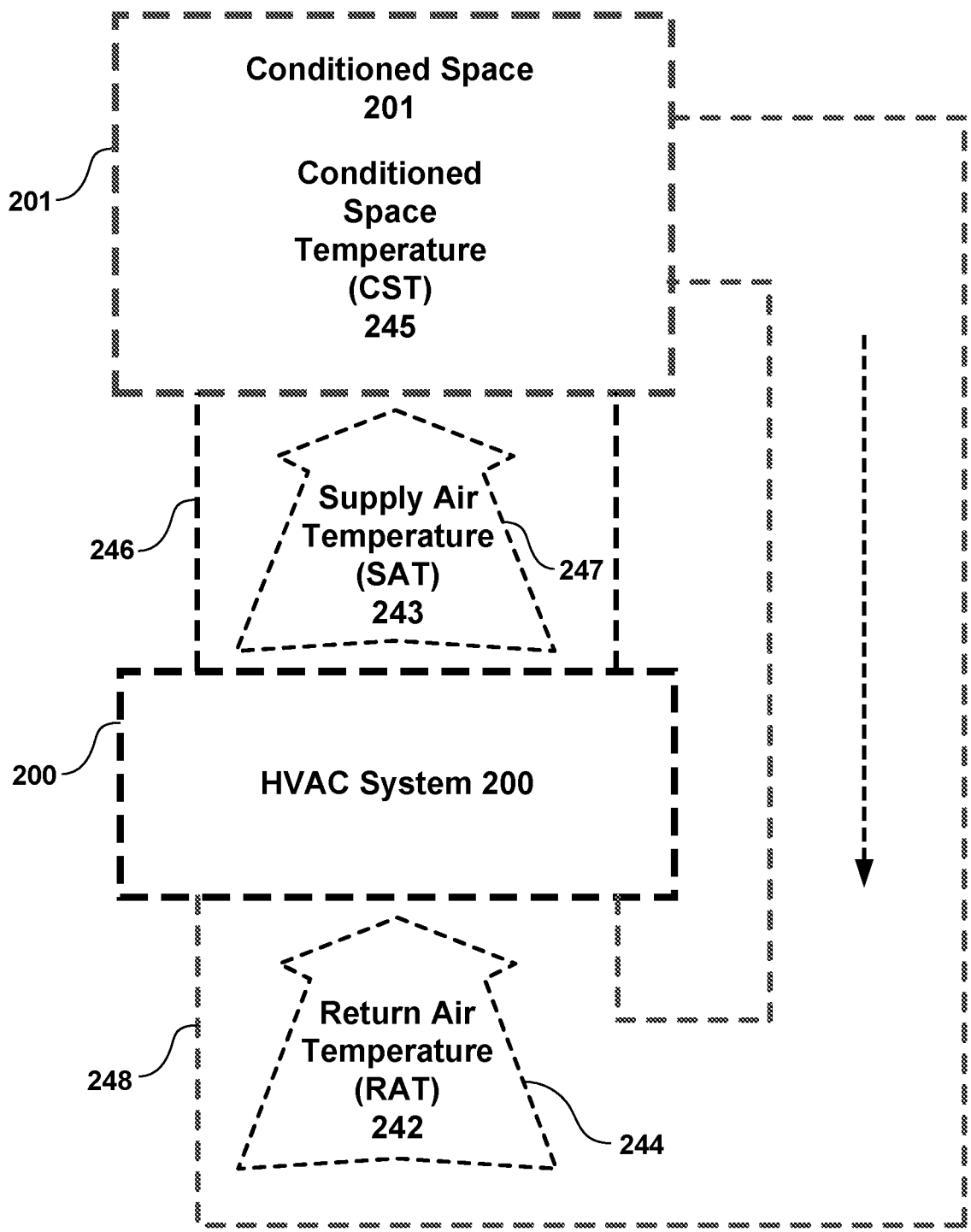
FIG. 3 shows an HVAC system and drybulb temperature sensors measuring a supply air temperature, a return air temperature, and a conditioned space temperature.

FIG. 3 shows the HVAC system 200 connected by a supply duct system 246 to a Conditioned Space 201 maintained at a Conditioned Space Temperature (CST) or a CST 245 by the HVAC system 200. The Conditioned Space 201 is supplied with a supply airflow 247 providing a Supply Air Temperature (SAT) or a SAT 243 from the HVAC system 200 which is provided with a return airflow 244 at a Return Air Temperature (RAT) or a RAT 242 from a return duct system 248 connected to the Conditioned Space 201.

Figure 4:
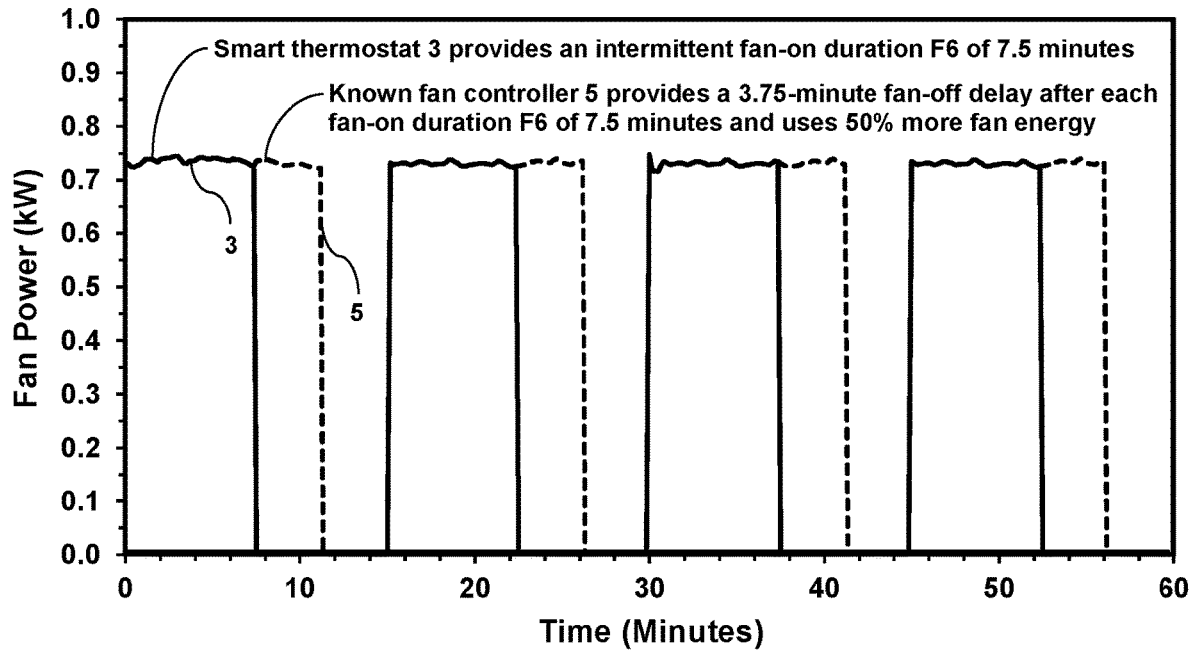
FIG. 4 shows a plot of the fan power kilowatts (kW) versus time for the known fan controller which provides a 3.75 minute fan-off delay after each 7.5 minute fan-on period provided by a smart thermostat and uses 50% more fan energy than the smart thermostat.

FIG. 4 shows a graph of fan power kilowatts (kW) on the vertical axis versus time (minutes) on the horizontal axis for the smart thermostat 3 which provides intermittent 7.5-minute fan-on durations. A known fan controller 5 provides 3.75 minute fan-off delays after each 7.5 minute fan-on duration and uses 50% more fan energy than the smart thermostat which would be about 1600 kWh per year of additional fan energy for this example. The known fan controller uses the fan G signal as a proxy for the Air Conditioner (AC) Y signal and mistakenly adds a fan-off delay of 3.75 minutes based on one-half the fan-on time from 4 to 8 minutes (0.5 times 7.5-minutes equals 3.75 minutes fan-off delay) as shown in FIG. 4.

Figure 5:
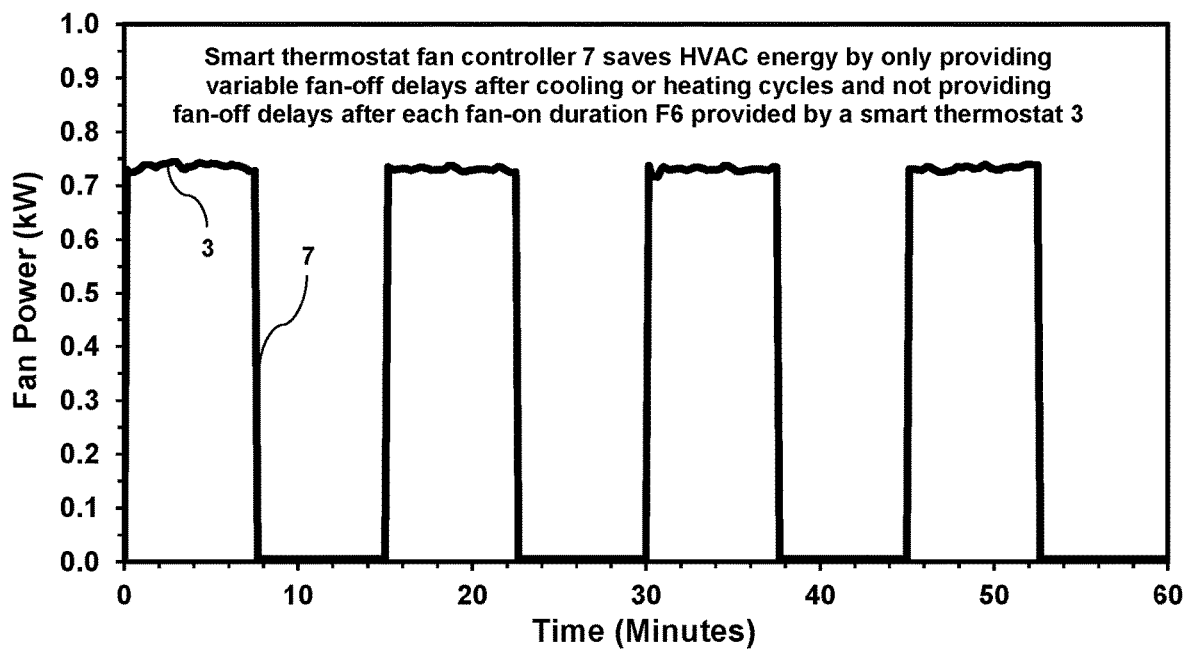
FIG. 5 shows the smart thermostat fan controller which provides no fan-off delay after each 7.5-minute fan-on period provided by smart thermostat and saves about 1600 kWh per year compared to the known fan controller shown in FIG. 4.

FIG. 5 shows a similar graph of the fan power (kW) versus time (minutes) for the smart thermostat 3 which provides the same intermittent 7.5-minute fan-on durations as shown in FIG. 4. However, the smart thermostat fan controller 7 detects the intermittent fan-on duration (e.g., fan G signal input energized without an AC Y signal or heat W signal) and does not operate the system fan/blower when the fan G signal input is de-energized based on at least one signal combination selected from the group consisting of: the fan G signal input was previously energized while the compressor Y signal input was not energized, and the fan G signal input was previously energized while the heat W signal input was not energized. The smart thermostat fan controller 7 will save about 1600 kWh per year compared to the known fan controller 5 shown in FIG. 4 (1600 kWh/year=0.73 kW times 3.75 minutes/duration times 4 fan-on durations/hour divided by 60 minutes/hour times 8760 hours/year). The four 7.5-minute fan-on durations are based on an ecobee® smart thermostat where a user selects an hourly fan-on duration schedule of 30 minutes per hour, and ecobee® divides the 30 minutes per hour fan-on duration into four 7.5-minute fan-on durations per hour separated by four 7.5-minute fan-off durations per hour. See non-patent publication by Ecobee Inc., "How to control your HVAC system's fan with your ecobee thermostat" Date: Jan. 13, 2020, Page 7, Published by Ecobee Inc., 25 Dockside Dr., Suite 700, Toronto, ON M5A 0B5, Canada https://support.ecobee.com/hc/en-us/articles/360004798951-How-to-control-your-HVAC-system-s-fan-with-your-ecobee-thermostat.

Figure 6:
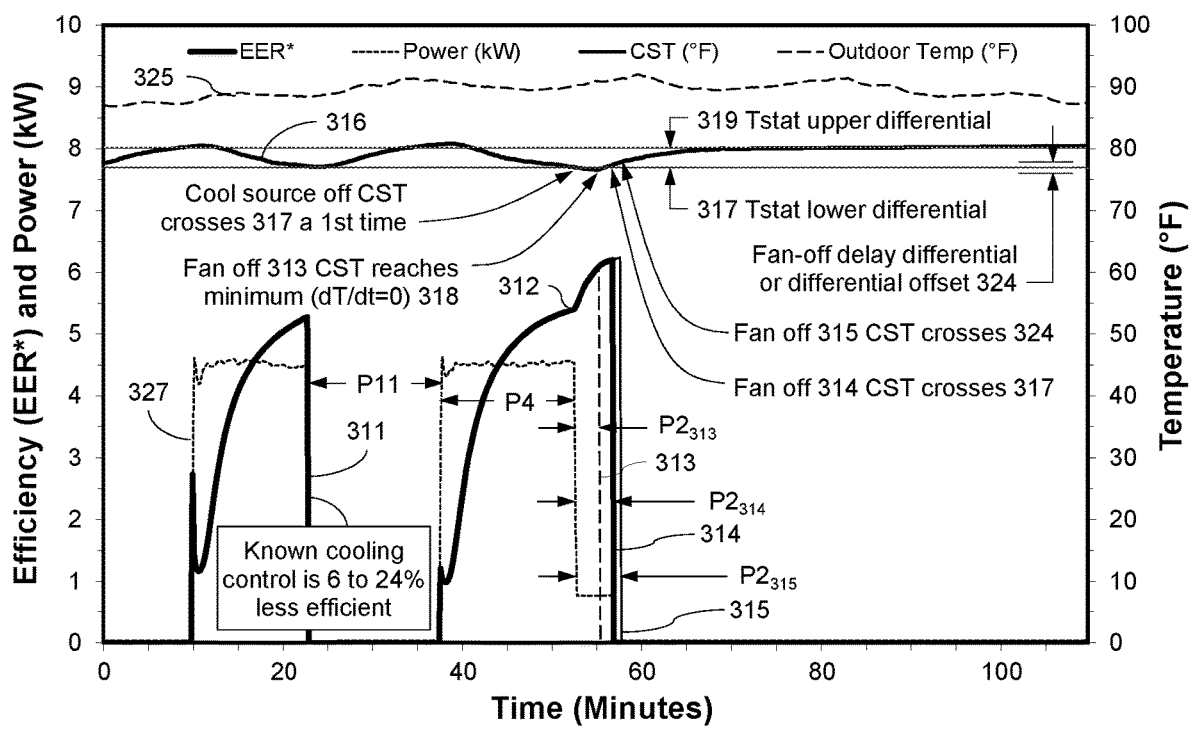
FIG. 6 shows a graph of cooling efficiency (Energy Efficiency Ratio, EER), cooling system power, outdoor air temperature, indoor thermostat temperature, and rate of change of indoor thermostat temperature versus time of operation for a direct-expansion air conditioning cooling system with known control and the smart thermostat fan controller.

FIG. 6 shows graphs representing the sensible cooling Energy Efficiency Ratio (EER*) versus time of operation for a DX AC cooling system with a known no-delay cooling curve 311 and the smart thermostat fan controller 7 cooling controls for a first variable fan-off delay cooling curve 313, a second variable fan-off delay cooling curve 314, and a third variable fan-off delay cooling curve 315. The EER* is defined as the total delivered sensible cooling energy measured in British thermal units (Btu) divided by the total electrical power input measured in Watt-hours (Wh). Also shown in FIG. 6 are graphs representing a total cooling system power measured in kiloWatts (kW) referred to as a power curve 327, the outdoor air temperature 325, the CST 316, a known lower thermostat differential 317 used to turn off the cooling system, and a known upper thermostat differential 319 used to turn on the cooling system.

FIG. 6 displays the EER* for the known no-delay cooling curve 311 representing the known control which turns off the AC compressor, condenser fan, and cooling ventilation fan when the CST 316 decreases to the known lower thermostat differential 317 a first time. The known no-delay cooling curve 311 cooling EER* is 5.27.

FIG. 6 displays the EER* for the first variable fan-off delay cooling curve 313 representing an embodiment of the smart thermostat fan controller 7. The AC compressor and condenser fan are turned off when the CST reaches the known lower thermostat differential 317 as shown in FIG. 4 where the power curve 327 drops from about 4.5 kW to 0.76 kW at 312. The cooling ventilation fan continues to operate for a variable fan-off delay time ($P2_{313}$) until the CST reaches a minimum Inflection Point (IP) at 318 where the rate of change of the CST with respect to time (dT/dt) is approximately equal to zero plus or minus a tolerance. The first variable fan-off delay cooling curve 313 EER* is 6.1 which is 13% greater than the no delay 5.4 EER* at 312.

FIG. 6 displays the EER* for the second variable fan-off delay cooling curve 314 representing another embodiment of the smart thermostat fan controller 7 where the cooling ventilation fan continues to operate for a variable fan-off delay time ($P2_{314}$) until the CST increases and crosses the known lower thermostat differential 317 again at least once. The second variable fan-off delay cooling curve 314 EER* is 6.17 which is 14.3% greater than the no delay 5.4 EER* at 312.

FIG. 6 displays the EER* for the third variable fan-off delay cooling curve 315 representing another embodiment of the smart thermostat fan controller 7 where the cooling ventilation fan continues to operate for a variable fan-off delay time ($P2_{315}$) until the CST increases and crosses a fan-off delay differential or a differential offset 324 one or more times. The third variable fan-off delay cooling curve 315 EER* is 6.25 which is 15.7% greater than the no delay 5.4 EER* at 312. The fan-off delay differential or differential offset varies based on at least one duration selected from the group consisting of: a duration of a previous fan-off delay time P2, a cooling duration P4, and an off-cycle duration P11.

In alternative embodiments of the smart thermostat fan controller 7, the variable fan-off delay time P2 may be based on at least one parameter selected from the group consisting of: the fan-on duration F6, the cooling duration P4, the off-cycle duration P11, the CST, the SAT, and the RAT. Operating individually or together, these variable fan-off delay embodiments can be used to recover and deliver additional sensible cooling energy from DX cooling or latent evaporative cooling (from water condensed on the evaporator during the DX cooling cycle) in order to improve efficiency and thermal comfort and save energy by reducing AC compressor operating time.

Figure 7:
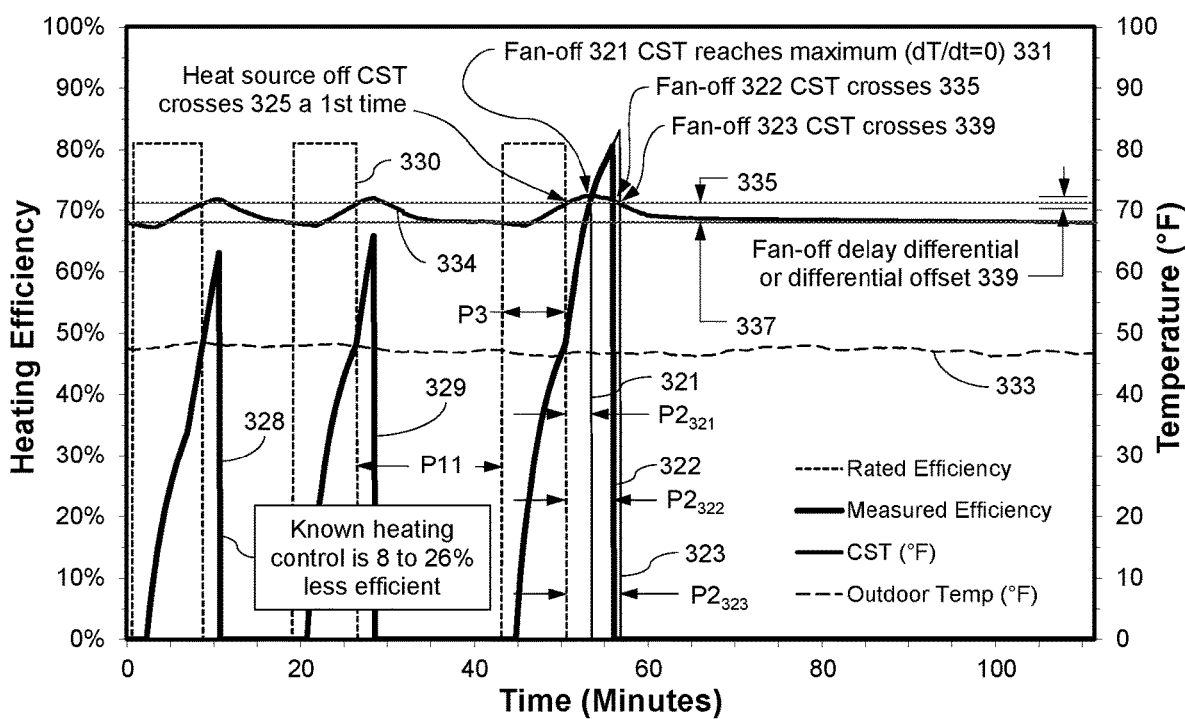
FIG. 7 shows a graph of heating efficiency, outdoor air temperature, indoor thermostat temperature, and rate of change of indoor thermostat temperature versus time of operation for a gas furnace heating system with a known control and the smart thermostat fan controller.

FIG. 7 shows graphs representing the heating efficiency versus time of operation for a gas furnace heating system with a known first heating curve 328 and a known second heating curve 329 and the smart thermostat fan controller 7 for a first variable fan-off delay heating curve 321, a second variable fan-off delay heating curve 322, and a third variable fan-off delay heating curve 323. The heating efficiency is defined as the total delivered heating energy measured in British thermal units (Btu) divided by the total gas energy input measured in Btu.

Also shown in FIG. 7 are graphs representing the rated efficiency 330, outdoor air temperature 333, the CST 334, a known upper thermostat differential 335 used to turn off the heating system, and a known lower thermostat differential 337 used to turn on the heating system.

FIG. 7 displays the heating efficiency for the known first heating curve 328 and a known second heating curve 329 of the known control. The known control turns on the furnace when the CST reaches the known lower thermostat differential 337 and turns off the furnace when the CST reaches the known upper thermostat differential 335. The known control heating ventilation fan operates for a fixed fan-off delay time after the known control turns off the heating system. For a gas furnace, the known control allows the Forced Air Unit (FAU) to control the heating fan-off delay using either a temperature-based fan-off delay or a fixed-time fan-off delay where the fixed-time delay is selected by an installer or is a default factory setting. For known first heating curve 328 the heating efficiency is 63% and for the known second heating curve 329 heating efficiency is 65.8%.

FIG. 7 displays the heating efficiency for the first variable fan-off delay heating curve 321 representing an embodiment of the smart thermostat fan controller 7 where the heating ventilation fan operates for a variable fan-off delay time ($P2_{321}$) until the CST reaches a maximum Inflection Point (IP) at 331 where the rate of change of the CST with respect to time (dT/dt) is approximately equal to zero plus or minus a confidence interval tolerance. The first variable fan-off delay heating curve 321 heating efficiency is 71.7% which is 13.9% greater than the known first heating curve 328 efficiency of 63% and 9% greater than the known second heating curve 329 efficiency of 65.8%.

FIG. 7 displays the heating efficiency for the second variable fan-off delay heating curve 322 representing another embodiment of the smart thermostat fan controller 7 where the heating ventilation fan continues to operate for a variable fan-off delay time ($P2_{322}$) until the CST increases and crosses the known upper thermostat differential 335 again at least once. The second variable fan-off delay heating curve 322 heating efficiency is 80.5% which is 27.8% greater than the known first heating curve 328 efficiency of 63% and 22.4% greater than the known second heating curve 329 efficiency of 65.8%.

FIG. 7 displays the heating efficiency for the third variable fan-off delay heating curve 323 representing another embodiment of the smart thermostat fan controller 7 where the heating ventilation fan continues to operate for a variable fan-off delay time ($P2_{323}$) until the CST decreases and crosses the variable fan-off delay differential or differential offset 339 at least once. The third variable fan-off delay heating curve 323 efficiency is 83.2% which is 32% greater than the known first heating curve 328 efficiency of 63% and 26.4% greater than the known second heating curve 329 efficiency of 65.8%. The heating variable fan-off delay may vary depending on at least one parameter selected from the group consisting of: a fan-on duration F6, a heating duration P3, an off-cycle time P11, the CST, the SAT, and the RAT. Operating individually or together, these variable fan-off delay embodiments can be used to recover and deliver additional heating energy from a heat source to improve efficiency and thermal comfort and reduce heating system operating time to save energy.

Figure 8:
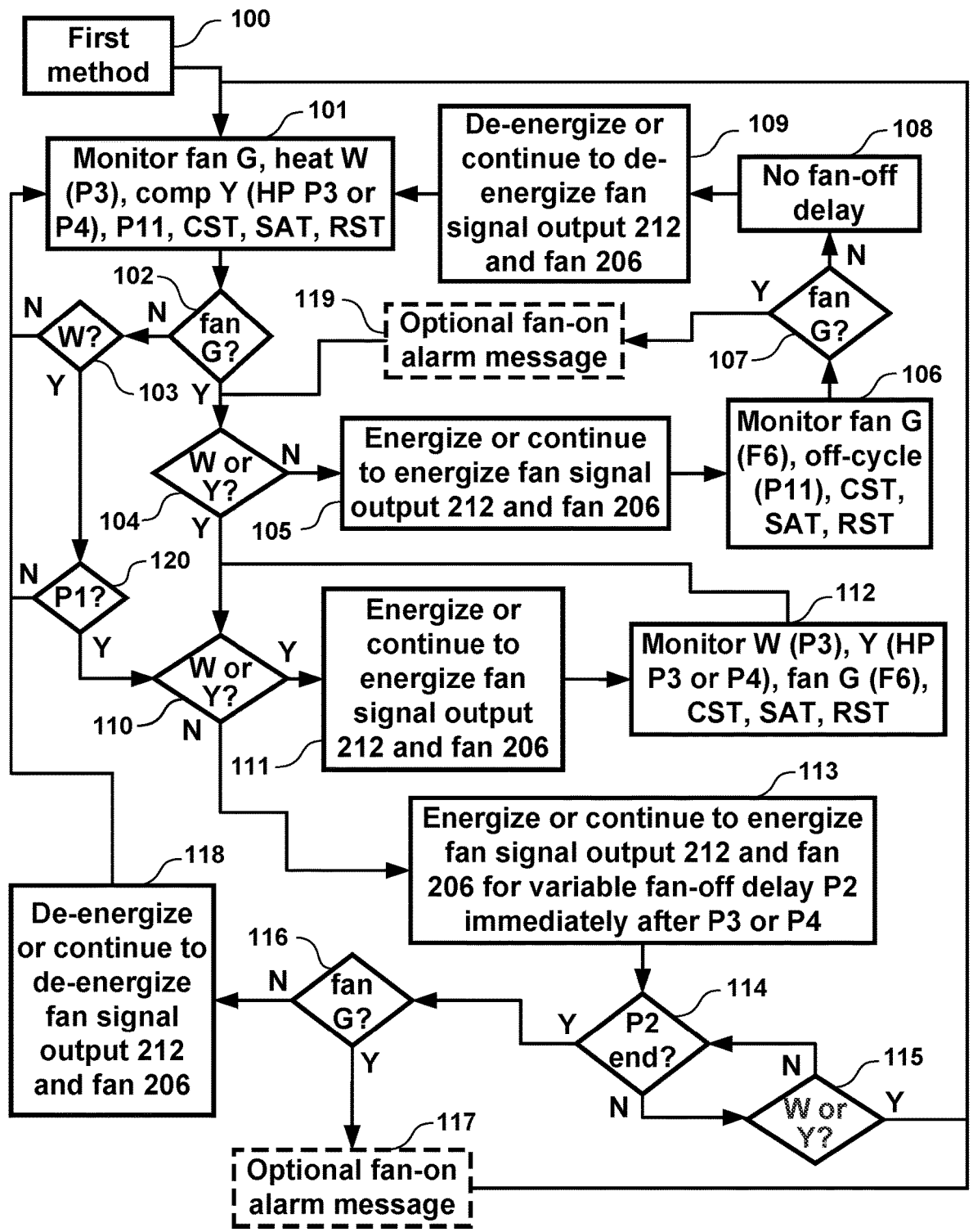
FIG. 8 shows a first method performed by a microprocessor of the smart thermostat fan controller for a Heating, Ventilating, Air Conditioning (HVAC) system including the fan plus cooling and heating.

FIG. 8 shows a first method 100 performed by the microprocessor 304 of the smart thermostat fan controller 7 to control a system fan/blower 206 for the HVAC system 200 including cooling and heating. Step 101 of FIG. 8 shows the method of monitoring at least one parameter selected from the group consisting of: a fan G signal and a fan-on duration F6 based on at least one fan-on duration control selected by a user, a heating duration P3 based on a thermostat call for heating, a cooling duration P4 based on a thermostat call for cooling, a thermostat fan-off delay duration P7 based on a fan G signal duration after the P3 or after the P4, an off-cycle duration P11 with neither the thermostat call for heating nor the thermostat call for cooling, a Conditioned Space Temperature (CST) 245, a Return Air Temperature (RAT) 242, and a Supply Air Temperature (SAT) 243. The thermostat call for heating is based on at least one heating signal combination selected from the group consisting of: a heat W signal from the thermostat with or without the fan G signal, a compressor Y signal and the fan G signal and a Heat Pump (HP) reversing valve (HP Rev) B signal, and the compressor Y signal and the fan G signal without a HP Rev O signal. The thermostat call for cooling is based on at least one cooling signal combination selected from the group consisting of: the compressor Y signal from the thermostat with the fan G signal, the compressor Y signal with the fan G signal without the HP Rev B signal, and the compressor Y signal with the fan G signal and the HP Rev O signal.

If step 102 of FIG. 8 is Yes (Y) the fan G signal is energized (fan G?), then the method proceeds to step 104 to check if the heat W or the compressor Y is energized (W or Y?). If step 104 is Yes (Y), the method goes to step 110 and if Yes (Y) the method proceeds to step 111 to energize or continue to energize the fan signal output 212 to operate a system fan/blower 206. At step 112 the method monitors the at least one parameter in step 101 and loops back to step 110 until W or Y? Is No (N) and goes to step 113. At step 113, the method energizes or continues to energize the fan signal output 212 and operate a system fan/blower 206 for a variable fan-off delay P2 provided by the fan controller immediately after the P3 when the heat W signal is de-activated or after the P4 when the compressor Y signal is de-activated.

The P2 in step 112 of FIG. 8 may be based on at least one duration selected from the group consisting of: the P3 while the heat W or the compressor Y signal is activated, and the duration of the off-cycle while the heat W signal is de-activated, the duration of the thermostat call for cooling while the compressor Y signal is activated, and the duration of the off-cycle while the compressor Y signal is de-activated. The P2 may also be based on at least one drybulb temperature measurement selected from the group consisting of: the SAT, the RAT, and the CST. The P2 may also be based on at least one fan-off delay temperature control selected from the group consisting of: the P2 is ended when the SAT is at least 5 degrees Fahrenheit (° F.) less than the CST or the SAT is at least 5° F. less than the RAT, the P2 is ended when the CST reaches an inflection point where a rate of change of the CST with respect to time (dT/dt) equals zero plus or minus a tolerance wherein the rate of change of the CST with respect to time is defined as a temperature difference between at least two measurements of the CST divided by a time difference between the at least two measurements of the CST, the P2 is ended when the CST increases above a previous measurement of the CST during the variable fan-off delay or the variable fan-off delay is ended when the CST crosses a lower cooling differential at least once.

At step 114 of FIG. 8, the method loops until the P2 end? During the loop the heat W signal or the compressor Y signal are monitored and if W or Y are Yes (Y), the method loops back to 101 to continue. If W or Y are No (N) the method continues until the P2 end? Step 116 checks the fan G signal (fan G?), and if Yes (Y), goes to step 117 to provide at least one fan-on alarm message (optional) using at least one communication method selected from the group consisting of: a graphical display, a text message, an email message, and an audio communication message. After step 117, the method continues to step 101. If step 116 is No (N) fan G signal is not activated, the method goes to step 118 to de-energize or continue to de-energize the fan signal output 212 and system fan/blower 206 and continues to 101.

If step 102 of FIG. 8 is Yes (Y) (fan G signal is activated), the method goes to step 104 and if No (N), W or Y are not activated, the method goes to step 105 to energize or continue to energize the fan signal output 212 and the system fan/blower 206 and goes to step 106 to monitor the at least one parameter in step 101 and loops through step 107 where fan G is Yes (Y) and step 119 optional fan-on alarm message. The method then goes to step 104 and checks if the heat W or compressor Y signals are activated (W or Y?). If step 104 is Yes (Y), the W or Y are activated, then the method goes to step 110 and continues as described above. If step 104 is No (N) (W or Y are not activated), the method continues to step 105 and step 107 until step 107 is No (N) the fan G signal is de-activated and goes to step 108 to not provide a fan-off delay and at step 109 de-energize or continue to de-energize the fan signal output 212 and the system fan/blower 206 and continues back to step 101. If step 102 is No (N) the fan G signal is de-activated, then the method goes to step 103 to check if the heat W signal is activated. If step 103 is No (N), the method continues to step 101. If step 102 is Yes (Y), the method goes to step 120 to check if the fan-on delay P1 has expired. If step 120 is No (N), the method continues to step 101. If step 120 is Yes (Y), the method goes to step 110 described above.

Figure 9:
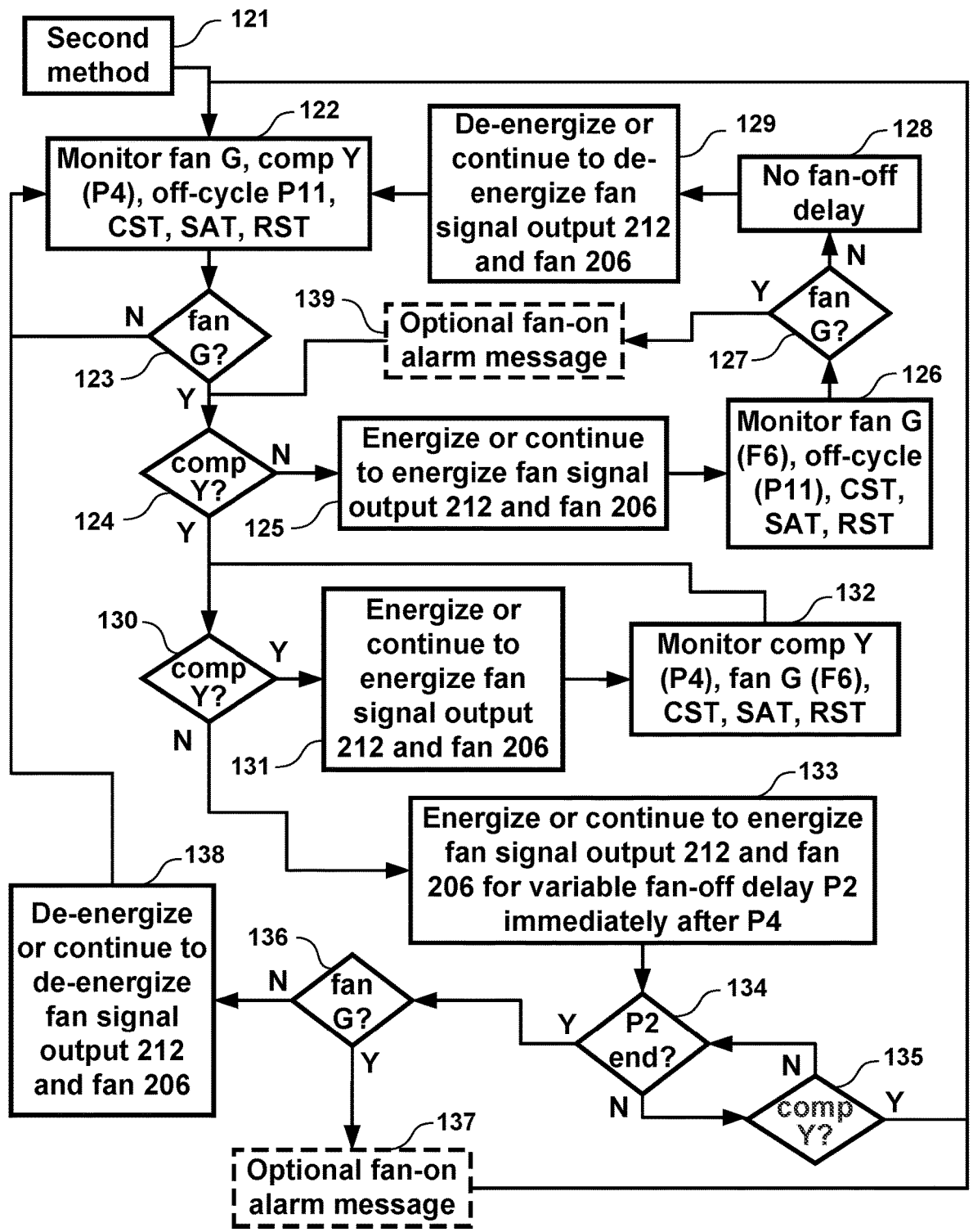
FIG. 9 shows a second method performed by a microprocessor of the smart thermostat fan controller for a HVAC system including the fan plus cooling.

FIG. 9 shows a second method 121 performed by the smart thermostat fan controller 7 to control a system fan/blower 206 for a HVAC system 200 for cooling. Step 122 of FIG. 9 shows the method of monitoring at least one parameter selected from the group consisting of: a fan G signal and the F6, the cooling duration P4, the P7, the P11, the CST, the RAT, and the SAT. If step 123 of FIG. 9 is No (N), the fan G signal is not energized (fan G?), then the method loops back to step 122. If step 123 is Yes (Y) the fan G signal is energized (fan G?), then the method proceeds to step 124 to check if the compressor Y is energized (comp Y?). If step 124 is Yes (Y), the method goes to step 130 and if Yes (Y) the method proceeds to step 111 to energize the fan signal output 212 and operate the system fan/blower 206. At step 132 the method monitors the at least one parameter in step 122 and loops back to step 130 until Y? Is No (N) and goes to step 133. At step 133, the method energizes or continues to energize the fan signal output 212 and operate a system fan/blower 206 for the P2 provided by the fan controller immediately after the P4 when compressor Y signal is de-activated.

The P2 in step 133 of FIG. 9 is based on at least one duration or temperature measurement described above for cooling. At step 134 of FIG. 9, the method loops until the P2 end? During the loop the compressor Y signal is monitored at step 135. If step 135 is Yes (Y), the method loops back to 122 to continue. If Y is No (N) the method continues until the P2 end? Step 136 checks the fan G signal (fan G?), and if Y, goes to step 137 to provide at least one fan-on alarm message described above. After step 137, the method continues to step 122. If step 136 is No (N) fan G signal is not activated, the method goes to step 138 to de-energize the fan signal output 212 and system fan/blower 206 and continues to 122.

If step 123 of FIG. 9 is Yes (Y) (fan G signal is activated), the method goes to step 124 and if No (N), the Y is not activated, the method goes to step 125 to energize the fan signal output 212 and the system fan/blower 206 and goes to step 126 to monitor the at least one parameter in step 122 and loops through step 127 where fan G is Yes (Y) and step 139 provides an optional fan-on alarm message. The method then goes to step 124 and checks if the heat W or compressor Y signals are activated (W or Y?). If step 124 is Yes (Y) the method goes to step 130 and continues as described above. If step 124 is No (N) (W or Y are not activated), the method continues through step 125 and step 127 until step 127 is No (N) the fan G signal is de-activated and goes to step 128 to not provide a fan-off delay and at step 129 de-energize or continue to de-energize the fan signal output 212 and the system fan/blower 206 and continues back to step 122.

Figure 10:
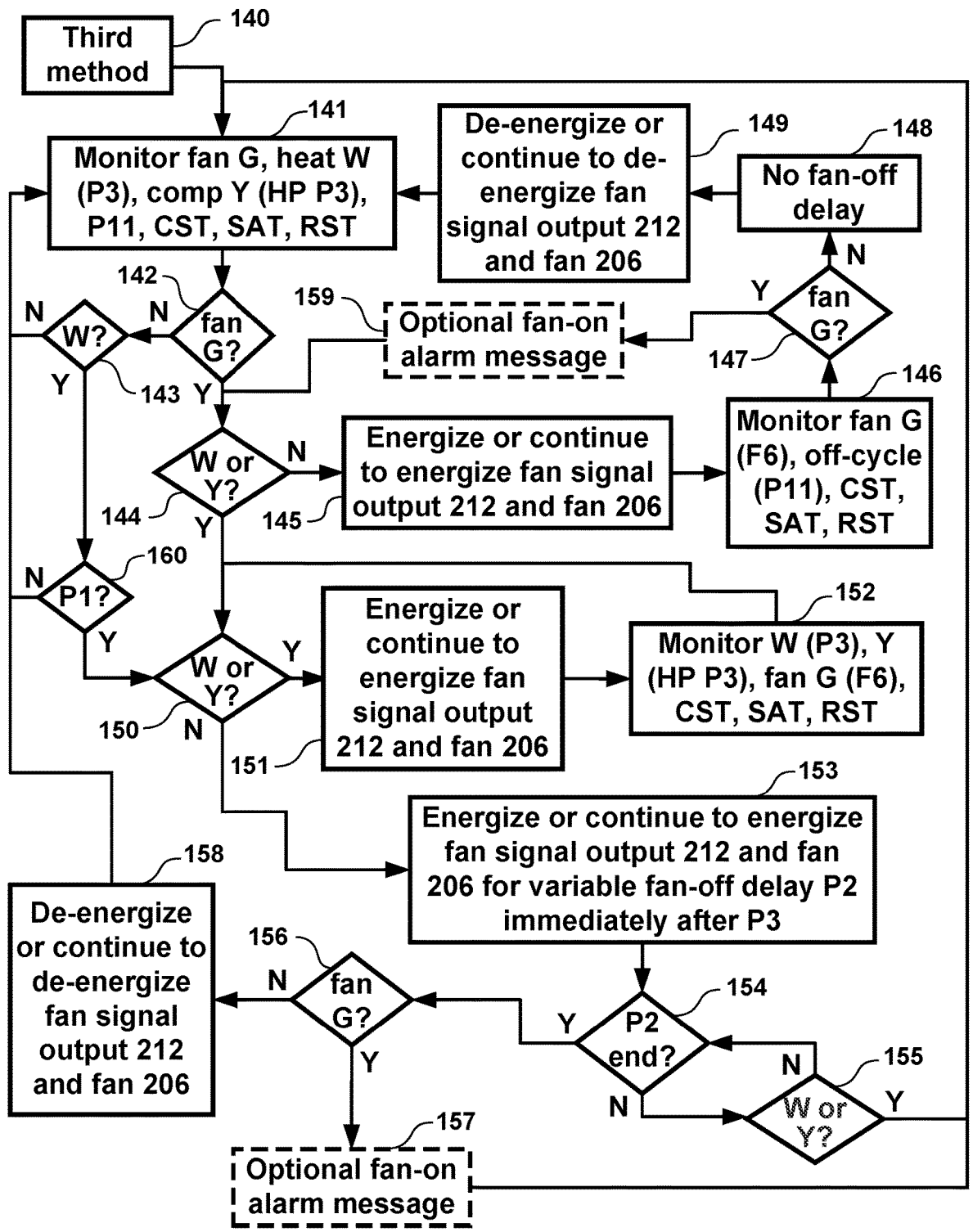
FIG. 10 shows a third method performed by a microprocessor of the smart thermostat fan controller for a HVAC system including the fan plus heating.

FIG. 10 shows a third method 140 performed by the microprocessor 304 of the smart thermostat fan controller 7 to control a system fan/blower 206 for a HVAC system for heating only. Step 141 of FIG. 10 shows the method of monitoring at least one parameter selected from the group consisting of: the F6, the P3, the P4, the P7, the P11, the CST, the RAT, and the SAT. If step 142 of FIG. 10 is No, the method goes to step 143 and if step 143 is No (N) the heat W signal is de-activated, the method loops back to step 141. If step 142 is Yes (Y) the fan G is energized (fan G?), then the method proceeds to step 144 to check if the heat W or the compressor Y (for a heat pump) is energized (W or Y?). If step 144 is Yes (Y), the method goes to step 150 and if Yes (Y) the method proceeds to step 151 to energize the fan signal output 212 to operate a system fan/blower 206. At step 152 the method monitors the at least one parameter in step 141 and loops back to step 150 until W? Is No (N) and goes to step 153. At step 153, the method energizes or continues to energize the fan signal output 212 and operates the system fan/blower 206 for a variable fan-off delay P2 provided by the fan controller immediately after the P3 when the heat W signal is de-activated.

The P2 in step 153 of FIG. 10 may be based on at least one duration selected from the group consisting of: the P3, the P11, the F6, the SAT, the RAT, and the CST as described above for heating. At step 154 of FIG. 10, the method loops until the P2 end? During the loop the heat W signal or the compressor Y (for a heat pump) is monitored and if W or Y is Yes (Y), the method loops back to 141 to continue. If W or Y? is No (N) the method continues until the P2 end? Step 156 checks the fan G signal (fan G?), and if Yes (Y), goes to step 157 to provide at least one fan-on alarm message (optional) using the at least one communication method. After step 157, the method continues to step 141. If step 156 is No (N) fan G signal is not activated, the method goes to step 158 to de-energize the fan signal output 212 and system fan/blower 206 and continues to 141.

If step 142 of FIG. 10 is Yes (Y) (fan G signal is activated), the method goes to step 144 and if No (N), W or Y are not activated, the method goes to step 145 to energize the fan signal output 212 and the system fan/blower 206 and goes to step 146 to monitor the at least one parameter in step 141 and loops through step 147 where fan G is Yes (Y) and step 159 optional fan-on alarm message. The method then goes to step 144 and checks if the heat W or compressor Y signals are activated (W or Y?). If step 144 is Yes (Y) the method goes to step 150 and continues as described above. If step 144 is No (N) (W or Y are not activated), the method continues through step 145 and step 147 until step 147 is No (N), the fan G signal from the thermostat is de-activated, and goes to step 148 and does not provide a fan-off delay. The method then goes to step 149 to de-energize or continue to de-energize the fan signal output 212 and the system fan/blower 206 and continues back to step 141. If step 142 is No (N) detecting the fan G signal is de-activated, the method goes to step 143 to check if the heat W signal is activated. If step 143 is No (N), the method continues to step 141. If step 143 is Yes (Y), the method goes to step 160 to check if the fan-on delay P1 has expired. If step 160 is No (N), the method continues to step 141. If step 160 is Yes (Y), the method goes to step 150 and step 151 and step 152 as described above.

The method of controlling a fan comprises: detecting a thermostat call for heating based on detecting heat W signal from a thermostat is activated or detecting a thermostat call for cooling based on detecting a compressor Y signal from the thermostat is activated and energizing a fan signal output from a fan controller and operating a system fan/blower while the heat W signal is activated or the compressor Y signal is activated and energizing or continuing to energize the fan signal output and operating the system fan/blower for a variable fan-off delay provided by the fan controller immediately after the heat W signal is de-activated or the immediately after compressor Y signal is de-activated and de-energizing the fan signal output and not operating the system fan/blower after the variable fan-off delay when a fan G signal is not activated. The method also comprises detecting the fan G signal is activated and the heat W signal is not activated and the compressor Y signal is not activated indicating at least one fan-on duration control selected by a user, and energizing or continuing to energize the fan signal output and operating the system fan/blower while the fan G signal is activated and de-energizing the fan signal output and not operating the system fan/blower and not providing the variable fan-off delay when the fan G signal is de-activated.

The method also comprises detecting the fan G signal is de-activated during the variable fan-off delay immediately after the heat W signal is de-activated or the fan G signal is de-activated during the variable fan-off delay immediately after the compressor Y signal is de-activated and continuing to energize the fan signal output and operating the system fan/blower for the variable fan-off delay and de-energizing the fan signal output and turning off the system fan/blower after the variable fan-off delay.

The variable fan-off delay is based on at least one duration selected from the group consisting of: the duration of the thermostat call for heating while the heat W or the compressor Y signal is activated, and the duration of the off-cycle while the heat W signal is de-activated, the duration of the thermostat call for cooling while the compressor Y signal is activated, and the duration of the off-cycle while the compressor Y signal is de-activated.

The variable fan-off delay is based on at least one drybulb temperature measurement selected from the group consisting of: a Supply Air Temperature (SAT), a Return Air Temperature (RAT), and a Conditioned Space Temperature (CST). The variable fan-off delay is based on at least one fan-off delay temperature control selected from the group consisting of: the variable fan-off delay for heating is ended when the SAT is at least 5 degrees Fahrenheit (° F.) greater than the CST or the SAT is at least 5° F. greater than the RAT, the variable fan-off delay for cooling is ended when the SAT is at least 5 degrees Fahrenheit (° F.) less than the CST or the SAT is at least 5° F. less than the RAT, the variable fan-off delay is ended when the CST reaches an inflection point where a rate of change of the CST with respect to time (dT/dt) equals zero plus or minus a tolerance wherein the rate of change of the CST with respect to time is defined as a temperature difference between at least two measurements of the CST divided by a time difference between the at least two measurements of the CST, the variable fan-off delay for heating is ended when the CST decreases below a previous measurement of the CST during the variable fan-off delay or the variable fan-off delay is ended when the CST crosses an upper heating differential at least once, and the variable fan-off delay for cooling is ended when the CST increases above a previous measurement of the CST during the variable fan-off delay or the variable fan-off delay is ended when the CST crosses a lower cooling differential at least once.

The at least one fan-on duration control selected by the user is selected from the group consisting of: a continuous fan-on duration setting or schedule, an intermittent fan-on duration setting or schedule, a variable fan-on duration setting or schedule, a fan-on duration setting or schedule, a recurring fan-on duration setting or schedule, and a fractional fan-on duration setting or schedule. The method provides a fan-on alarm message indicating the system fan/blower is operating intermittently or continuously and providing the fan-on alarm message using at least one communication method selected from the group consisting of: a graphical display, a text message, an email message, and an audio communication message.

Checking proper installation includes verifying a short fan-off delay of less than 30 seconds when the thermostat call for heating or the thermostat call for cooling is less than 2 minutes for verifying the system fan/blower continues operating for the short fan-off delay after the thermostat call for heating or the thermostat call for cooling and verifying the system fan/blower turns off at an end of the short fan-off delay based on at least one verification method selected from the group consisting of: decreasing a cooling thermostat setpoint below a Conditioned Space Temperature (CST) and energizing the cooling system for less than 2 minutes and increasing the thermostat setpoint above the CST and de-energizing the cooling system, and increasing heating thermostat setpoint above the CST and enabling the thermostat call for heating and energizing the heating system for less than 2 minutes and decreasing the thermostat setpoint below the CST and de-energizing the heating system.

The thermostat call for heating is based on at least one heating signal combination selected from the group consisting of: a heat W signal from the thermostat with or without the fan G signal, a compressor Y signal and the fan G signal and a Heat Pump (HP) reversing valve (HP Rev) B signal, and the compressor Y signal and the fan G signal without a HP Rev O signal. The thermostat call for cooling is based on at least one cooling signal combination selected from the group consisting of: the compressor Y signal from the thermostat with the fan G signal, the compressor Y signal with the fan G signal without the HP Rev B signal, and the compressor Y signal with the fan G signal and the HP Rev O signal.

Processing the heat W signal as the Heat Pump (HP) reversing valve signal is based on detecting at least one signal selected from the group consisting of: a sinusoid signal on a HP detect signal input provided by a wire connected to a hot R signal input from a system transformer to detect a HP reversing valve energized for cooling on the heat W signal input, and a rectified signal on the HP detect signal input provided by a diode connected to the hot R signal input from the system transformer to detect the HP reversing valve energized for heating on the heat W signal input. The method further comprises eliminating at least one false positive stray voltage signal by establishing at least one minimum threshold voltage for at least one active control signal from the thermostat using at least one Zener diode and at least one opto-isolator and processing the at least one active control signal from the thermostat selected from the group consisting of: the fan G signal, the compressor Y signal, and the heat W signal.

The method further includes detecting the heat W signal is activated and the fan G signal is not activated and waiting to energize the fan signal output and operating the system fan/blower until a fan-on delay P1 has expired to provide time for a heat exchanger of a gas furnace to reach operating temperature.

While the invention herein disclosed has been described by means of specific embodiments and applications thereof, numerous modifications and variations could be made thereto by those skilled in the art without departing from the scope of the invention set forth in the claims.

The invention claimed is:

1. A method of controlling a fan, comprising:
   detecting a thermostat call for heating based on detecting a heat W signal from a thermostat is activated or detecting a thermostat call for cooling based on detecting a compressor Y signal from the thermostat is activated and energizing a fan signal output from a fan controller and operating a system fan/blower while the heat W signal is activated or the compressor Y signal is activated and energizing or continuing to energize the fan signal output and operating a system fan/blower for a variable fan-off delay provided by the fan controller immediately after the heat W signal is de-activated or the immediately after compressor Y signal is de-activated and de-energizing the fan signal output and not operating the system fan/blower after the variable fan-off delay when a fan G signal is not activated;
   wherein the variable fan-off delay is based on at least one duration selected from the group consisting of: the duration of the thermostat call for heating while the heat W or the compressor Y signal is activated, and the duration of the thermostat call for cooling while the compressor Y signal is activated; and
   detecting the fan G signal is activated and the heat W signal is not activated and the compressor Y signal is not activated indicating at least one fan-on duration control selected by a user, and energizing or continuing to energize the fan signal output and operating the system fan/blower while the fan G signal is activated and de-energizing the fan signal output and not operating the system fan/blower and not providing the variable fan-off delay when the fan G signal is de-activated.

2. The method of claim 1, further including detecting the fan G signal is de-activated during the variable fan-off delay immediately after the heat W signal is de-activated or the fan G signal is de-activated during the variable fan-off delay immediately after the compressor Y signal is de-activated and continuing to energize the fan signal output and operating the system fan/blower for the variable fan-off delay and de-energizing the fan signal output and turning off the system fan/blower after the variable fan-off delay.

3. The method of claim 1, wherein the at least one fan-on duration control selected by the user is selected from the group consisting of: a continuous fan-on duration setting or a schedule, an intermittent fan-on duration setting or the schedule, a variable fan-on duration setting or the schedule, a fan-on duration setting or the schedule, a recurring fan-on duration setting or the schedule, and a fractional fan-on duration setting or the schedule.

4. The method of claim 1, further comprising providing a fan-on alarm message indicating the system fan/blower is operating intermittently or continuously and providing the fan-on alarm message using at least one communication method selected from the group consisting of: a graphical display, a text message, an email message, and an audio communication message.

5. The method of claim 1, further including a short fan-off delay of less than 30 seconds when the thermostat call for heating or the thermostat call for cooling is less than 2 minutes for verifying the system fan/blower continues operating for the short fan-off delay after the thermostat call for heating or the thermostat call for cooling and verifying the system fan/blower turns off at an end of the short fan-off delay based on at least one verification method selected from the group consisting of:
   decreasing a cooling thermostat setpoint below a Conditioned Space Temperature (CST) and energizing the cooling system for less than 2 minutes and increasing the thermostat setpoint above the CST and de-energizing the cooling system, and
   increasing heating thermostat setpoint above the CST and enabling the thermostat call for heating and energizing the heating system for less than 2 minutes and decreasing the thermostat setpoint below the CST and de-energizing the heating system.

6. The method of claim 1, wherein:
   Detecting the thermostat call for heating is based on at least one heating signal combination selected from the group consisting of: the heat W signal from the thermostat with or without the fan G signal, the compressor Y signal and the fan G signal and a Heat Pump (HP) reversing valve (HP Rev) B signal, and the compressor Y signal and the fan G signal without a HP Rev O signal; and
   Detecting the thermostat call for cooling is based on at least one cooling signal combination selected from the group consisting of: the compressor Y signal from the thermostat with the fan G signal, the compressor Y signal with the fan G signal without the HP Rev B signal, and the compressor Y signal with the fan G signal and the HP Rev O signal.

7. The method of claim 6, further comprising processing the heat W signal as the Heat Pump (HP) reversing valve signal based on detecting at least one signal selected from the group consisting of:
   a sinusoid signal on a HP detect signal input provided by a wire connected to a hot R signal input from a system transformer to detect a HP reversing valve energized for cooling on the heat W signal input, and
   a rectified signal on the HP detect signal input provided by a diode connected to the hot R signal input from the system transformer to detect the HP reversing valve energized for heating on the heat W signal input.

8. The method of claim 6, further comprising eliminating at least one false positive stray voltage signal by establishing at least one minimum threshold voltage for at least one active control signal from the thermostat using at least one Zener diode and at least one opto-isolator and processing the at least one active control signal from the thermostat selected from the group consisting of: the fan G signal, the compressor Y signal, and the heat W signal.

9. The method of claim 1, further including detecting the heat W signal is activated and the fan G signal is not activated and waiting to energize the fan signal output and operating the system fan/blower until a fan-on delay P1 has expired to provide time for a heat exchanger of a gas furnace to reach operating temperature.

10. A method of controlling a fan, comprising:
    detecting a thermostat call for heating based on detecting a heat W signal from a thermostat is activated or detecting a thermostat call for cooling based on detecting a compressor Y signal from the thermostat is activated and energizing a fan signal output from a fan controller and operating a system fan/blower while the heat W signal is activated or the compressor Y signal is activated and energizing or continuing to energize the fan signal output and operating a system fan/blower for a variable fan-off delay provided by the fan controller immediately after the heat W signal is de-activated or the immediately after compressor Y signal is de-activated and de-energizing the fan signal output and not operating the system fan/blower after the variable fan-off delay when a fan G signal is not activated;

wherein the variable fan-off delay is based on at least one drybulb temperature measurement selected from the group consisting of: a Supply Air Temperature (SAT), a Return Air Temperature (RAT), and a Conditioned Space Temperature (CST); and, detecting the fan G signal is activated and the heat W signal is not activated and the compressor Y signal is not activated indicating at least one fan-on duration control selected by a user, and energizing or continuing to energize the fan signal output and operating the system fan/blower while the fan G signal is activated and de-energizing the fan signal output and not operating the system fan/blower and not providing the variable fan-off delay when the fan G signal is de-activated.

11. The method of claim 10, wherein the variable fan-off delay is based on at least one fan-off delay temperature control selected from the group consisting of:

the variable fan-off delay for heating is ended when the SAT is at least 5 degrees Fahrenheit (° F.) greater than the CST or the SAT is at least 5° F. greater than the RAT, the variable fan-off delay for cooling is ended when the SAT is at least 5° F. less than the CST or the SAT is at least 5° F. less than the RAT, the variable fan-off delay is ended when the CST reaches an inflection point where a rate of change of the CST with respect to time (dT/dt) equals zero plus or minus a tolerance wherein the rate of change of the CST with respect to time is defined as a temperature difference between at least two measurements of the CST divided by a time difference between the at least two measurements of the CST, the variable fan-off delay for heating is ended when the CST decreases below a previous measurement of the CST during the variable fan-off delay or the variable fan-off delay is ended when the CST crosses an upper heating differential at least once, and the variable fan-off delay for cooling is ended when the CST increases above the previous measurement of the CST during the variable fan-off delay or the variable fan-off delay is ended when the CST crosses a lower cooling differential at least once.

12. A method of controlling a fan, comprising:

detecting a thermostat call for cooling based on detecting a compressor Y signal is activated and energizing a fan signal output from a fan controller and operating a system fan/blower while the compressor Y signal is activated and energizing or continuing to energize the fan signal output and operating the system fan/blower for a variable fan-off delay provided by the fan controller immediately after the compressor Y signal is de-activated and de-energizing the fan signal output and not operating the system fan/blower after the variable fan-off delay when a fan G signal is not activated;

wherein the variable fan-off delay is based on at least one duration selected from the group consisting of: the duration of the thermostat call for cooling while the compressor Y signal is activated; and detecting the fan G signal is activated and the compressor Y signal is not activated indicating at least one fan-on duration control selected by a user, and energizing or continuing to energize the fan signal output and operating the system fan/blower while the fan G signal is activated and de-energizing the fan signal output and not operating the system fan/blower and not providing the variable fan-off delay when the fan G signal is de-activated after the at least one fan-on duration control selected by a user.

13. The method of claim 12, further including detecting the fan G signal is de-activated during the variable fan-off delay immediately after the compressor Y signal is de-activated and continuing to energize the fan signal output and operate the system fan/blower for the variable fan-off delay and de-energizing the fan signal output and turning off the system fan/blower after the variable fan-off delay.

14. The method of claim 12, further comprising providing a fan-on alarm message indicating the system fan/blower is operating intermittently or continuously and providing the fan-on alarm message using at least one communication method selected from the group consisting of: a graphical display, a text message, an email message, and an audio communication message.

15. The method of claim 12, wherein the thermostat call for cooling is based on at least one cooling signal combination selected from the group consisting of: the compressor Y signal from the thermostat with the fan G signal, the compressor Y signal with the fan G signal without a Heat Pump (HP) reversing valve (HP Rev) B signal, and the compressor Y signal with the fan G signal and a HP Rev O signal.

16. The method of claim 15, further comprising processing a heat W signal as a HP Rev signal based on detecting at least one signal selected from the group consisting of:

a sinusoid signal on the HP detect signal input provided by a wire connected to a hot R signal input from a system transformer to detect a HP reversing valve energized for cooling on the heat W signal input, and a rectified signal on the HP detect signal input provided by a diode connected to the hot R signal input from the system transformer to detect the HP reversing valve energized for heating on the heat W signal input.

17. The method of claim 15, further comprising eliminating at least one false positive stray voltage signal by establishing at least one minimum threshold voltage for at least one active control signal from the thermostat using at least one Zener diode and at least one opto-isolator and processing the at least one active control signal from the thermostat selected from the group consisting of: the fan G signal, the compressor Y signal, and a heat W signal.

18. The method of claim 15, further including a short fan-off delay of less than 30 seconds when the thermostat call for cooling is less than 2 minutes for verifying the system fan/blower continues operating for the short fan-off delay after the thermostat call for cooling and verifying the system fan/blower turns off at an end of the short fan-off delay based on decreasing a cooling thermostat setpoint below a Conditioned Space Temperature (CST) and energizing the cooling system for less than 2 minutes and increasing the thermostat setpoint above the CST and de-energizing the cooling system.

19. The method of claim 12, A method of controlling a fan, comprising:
   detecting a thermostat call for cooling based on detecting a compressor Y signal is activated and energizing a fan signal output from a fan controller and operating a system fan/blower while the compressor Y signal is activated and energizing or continuing to energize the fan signal output and operating the system fan/blower for a variable fan-off delay provided by the fan controller immediately after the compressor Y signal is de-activated and de-energizing the fan signal output and not operating the system fan/blower after the variable fan-off delay when a fan G signal is not activated;
   wherein the variable fan-off delay is based on at least one drybulb temperature measurement selected from the group consisting of: a Supply Air Temperature (SAT), a Return Air Temperature (RAT), and a Conditioned Space Temperature (CST); and
   detecting the fan G signal is activated and the compressor Y signal is not activated indicating at least one fan-on duration control selected by a user, and energizing or continuing to energize the fan signal output and operating the system fan/blower while the fan G signal is activated and de-energizing the fan signal output and not operating the system fan/blower and not providing the variable fan-off delay when the fan G signal is de-activated after the at least one fan-on duration control selected by a user.

20. The method of claim 19, wherein the variable fan-off delay is based on at least one fan-off delay temperature control selected from the group consisting of:
   the variable fan-off delay is ended when the SAT is at least 5 degrees Fahrenheit (° F.) less than the CST or the SAT is at least 5° F. less than the RAT,
   the variable fan-off delay is ended when the CST reaches an inflection point where a rate of change of the CST with respect to time (dT/dt) equals zero plus or minus a tolerance wherein the rate of change of the CST with respect to time is defined as a temperature difference between at least two measurements of the CST divided by a time difference between the at least two measurements of the CST, and
   the variable fan-off delay is ended when the CST increases above a previous measurement of the CST during the variable fan-off delay or the variable fan-off delay is ended when the CST crosses a lower cooling differential at least once.

21. The method of claim 19, wherein the at least one fan-on duration control selected by the user is selected from the group consisting of: a continuous fan-on duration setting or a schedule, an intermittent fan-on duration setting or the schedule, a variable fan-on duration setting or the schedule, a fan-on duration setting or the schedule, a recurring fan-on duration setting or the schedule, and a fractional fan-on duration setting or the schedule.

* * * * *